No. 784,886. PATENTED MAR. 14, 1905.
T. H. PRITCHARD.
EYEGLASSES.
APPLICATION FILED NOV. 22, 1904.
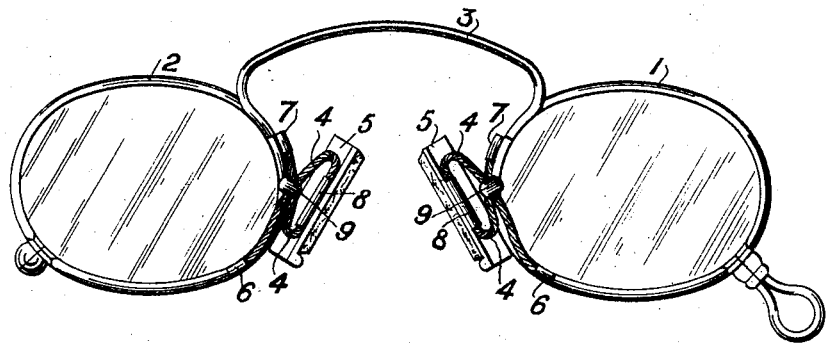
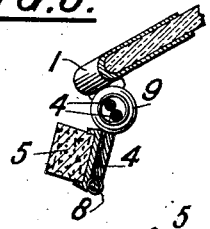
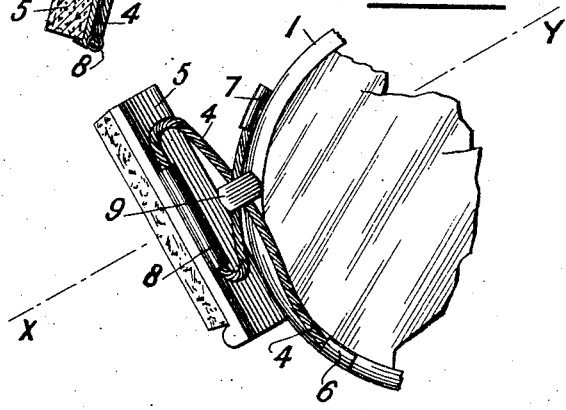
Witnesses
Chas. H. Smith
Leopold Leer
Inventor
Thomas H. Pritchard
by Harold Serrell
Atty No. 784,886.                                    Patented March 14, 1905.

UNITED STATES PATENT OFFICE.

THOMAS HENRY PRITCHARD, OF LONDON, ENGLAND.

EYEGLASSES.

SPECIFICATION forming part of Letters Patent No. 784,886, dated March 14, 1905.

Application filed November 22, 1904. Serial No. 233,819.

*To all whom it may concern:*

Be it known that I, THOMAS HENRY PRITCHARD, a subject of the King of Great Britain, and a resident of London, England, have invented certain new and useful Improvements in Eyeglasses, of which the following is a specification.

This invention refers to improvements in eyeglasses or pince-nez of that class having so-called "rigid" bridge-pieces, the pressure or grip of the plaquettes not being derived, or only very partially derived, from any spring or elasticity there may be in such bridge-pieces.

The present invention particularly refers to improvements in the mounting or carrying of the plaquettes from the frames of such eyeglasses, the object being to so carry the plaquettes from the frames that they can be displaced against the elastic resistance of their carrying devices in any direction whatever and always (when so permitted) returned to those normal positions.

I am aware that plaquettes have been heretofore pivoted to arms, which latter have been jointed to the framework of the glasses, so that the plaquettes have been carried by a mechanical universally-jointed connection, and that plaquettes so mounted have been carried to their normal positions by springs; but the object of my invention is to so flexibly mount the said plaquettes that they shall be, as aforesaid, capable of being moved against an elastic resistance in any direction whatever from their normal positions, and this without the employment of jointed pivotal and lever connections. With these ends in view I attach each plaquette to the framework of the glasses by means of a flexible metallic wire or cable composed of laid or twisted strands, the ends of which wires are fixed to the framework, while the plaquettes are fixed to the said wires at some point in the lengths of same. By these means each plaquette is held in a perfectly flexible manner in its normal position, and upon being applied to the wearer's nose the plaquettes are separated against the spring-like action of the wires or cables, hereinafter termed "cables," and the said plaquettes are at the same time free to assume whatever position they are called upon to adapt themselves to the contour of the nose to which they are applied, and, moreover, with plaquettes so mounted the eyeglasses may be adjusted to the nose of the wearer and be manipulated into a proper position by the use of only one hand and fixed with ease and security.

In order that the invention may be fully understood, an example of construction is described with reference to the accompanying drawings, whereon—

Figure 1 is a rear elevation of a pair of eyeglasses with the plaquettes mounted according to the said invention, Fig. 2 being an elevation, on an enlarged scale, of a portion of one of the glass-frames, showing the plaquette attached thereto; and Fig. 3 is a section taken on the inclined plane represented by the trace X Y.

The framework of the eyeglasses or pince-nez, as shown, is composed, as is common, of the two eyeglass-frames 1 2, united by a so-called "rigid" bridge-piece 3.

4 4 show the two pieces of laid wire cable by which the plaquettes 5 5 are attached to the framework of the eyeglasses, and since the attachment is similar for both plaquettes I will refer in the specification to one of the attachments in order to simplify the description.

The wire cable 4 is fixed to the framework at its two ends 6 and 7 by any convenient means—for example, by the ends of the cable being inserted and fixed in ferrules and the ferrules themselves fixed—say by soldering—to the framework. Before the fixture of the ends 6 7 the plaquettes are attached—say by ferrule 8—to the length of cable between the two ends, and the ends of the cable are then threaded through a bead 9 in opposite directions, through which bead they can move freely, so that that end of the cable coming from the lower end of the plaquette passes through the bead and becomes the uppermost end for attachment to the framework, while, conversely, that part of the cable extending from the upper end of the plaquette passes through the bead and becomes the lowermost portion for attachment to the framework. With such means of fixture I have found that the plaquette is retained in its normal position with the proper amount of elastic resistance against displacement and, moreover, that the plaquette not only can be moved out of its normal position in any direction whatever, but in whatever direction it is so moved it still offers that necessary elastic resistance.

In the construction shown the cable 4 for one of the plaquettes consists, as has been explained, of one piece of cable composed of laid or twisted strands, and when fitted and fixed as shown the movement of the plaquette upon being opened out has a torsional or twisting action upon the wire cable. Thus when the strands of the wire cable are laid or twisted as shown with regard to the left-hand plaquette of Fig. 1 and the plaquette is forced back by application to the nose of the wearer that portion of the cable leading to the fixture 7 will be torsionally twisted, so as to tighten up its strands, while the remaining portion will have a torsional twist in the reverse direction. This is a construction which I have found to answer the purpose well; but at the same time I would have it understood that I do not limit myself to making the wire cable 4 in one piece, because obviously it might be in two pieces— i. e., the portion from the plaquette at 8 to the fixture at 7 might be composed of one piece of cable laid in one direction, while the portion from 8 to the fixture at 6 might be composed of another length of cable with its strands laid in the opposite direction, so that both members of the cable connecting the plaquette to the frame will be torsionally twisted by the moving aside of the said plaquette.

What I claim as my invention, and desire to secure by Letters Patent, is—

1. In eyeglasses or pince-nez, a framework, flexible cables having their ends fixed in said framework, and plaquettes each of which is secured to a cable between the respective ends thereof.

2. In eyeglasses or pince-nez, the combination with the frames, glasses carried in the said frames, and a bridge-piece connecting the said frames; of two plaquettes, a length of flexible metallic cable fixed about centrally of its length to the back of each plaquette, the ends of the cable of one plaquette being fixed to one of the eyeglass-frames, and the ends of the cable of the other plaquette being fixed to the other eyeglass-frame to flexibly and elastically connect the said plaquettes to the said frames, substantially as set forth.

3. In eyeglasses or pince-nez, the combination with the frames, glasses carried in the said frames, and a rigid bridge-piece connecting the said frames; of two plaquettes, a length of flexible metallic cable fixed about centrally to the back of each plaquette, a bead for each plaquette through which bead the free ends of the cable are threaded in reverse directions, and means for fixing the free ends of the cable of each plaquette to their respective eyeglass-frames, substantially as set forth.

THOMAS HENRY PRITCHARD.

Witnesses:
THOMAS W. ROGERS,
WM. A. MARSHALL.